Dec. 27, 1966  H. A. SHUMAN  3,293,752
GEOMETRICAL INSTRUMENT
Filed July 29, 1965
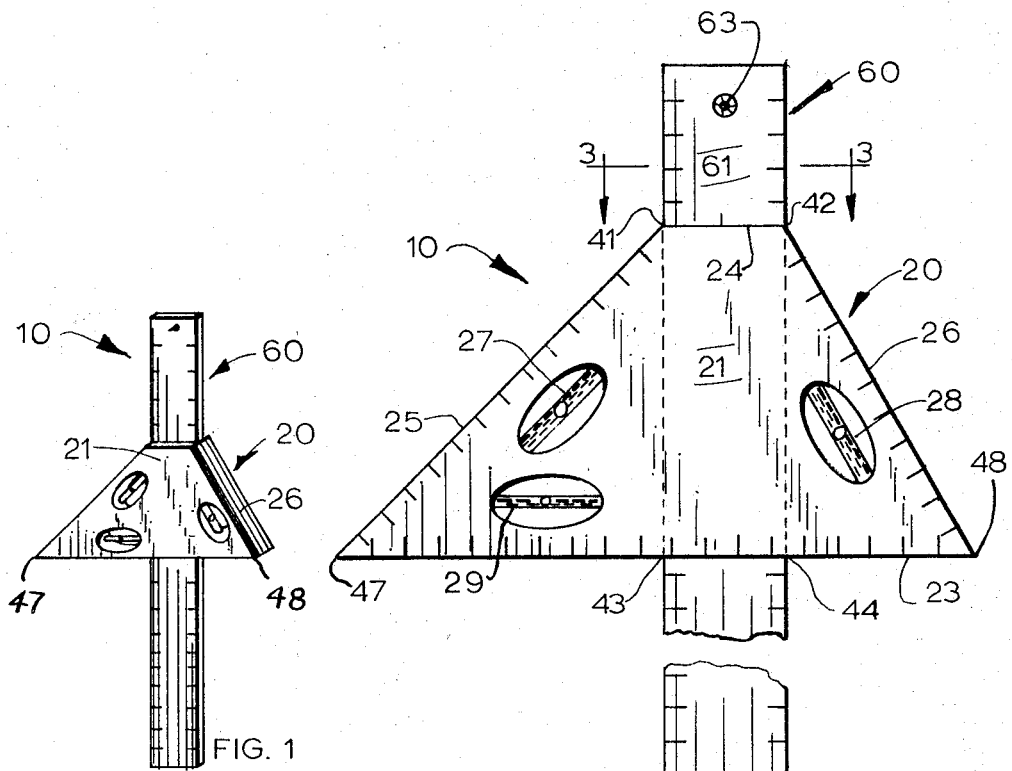
FIG. 1
FIG. 2
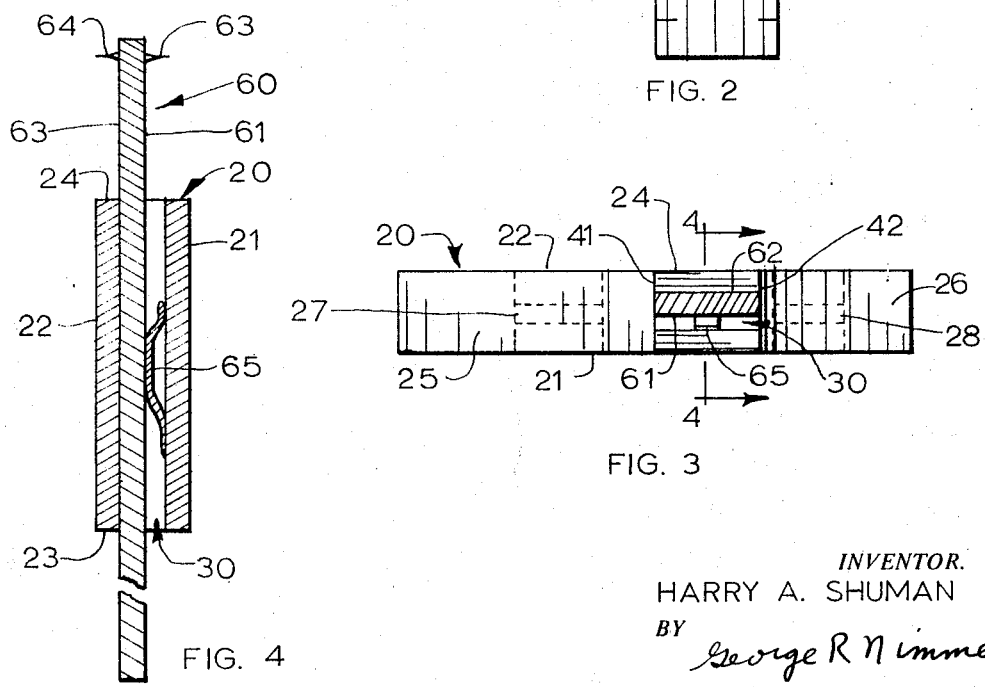
FIG. 4
FIG. 3
INVENTOR.
HARRY A. SHUMAN
BY George R Nimmer
ATTORNEY

United States Patent Office 3,293,752
Patented Dec. 27, 1966

3,293,752
GEOMETRICAL INSTRUMENT
Harry A. Shuman, Hastings, Nebr., assignor to Harriet Shuman Davis and Anne Shuman Mercier, both of Hastings, Nebr.
Filed July 29, 1965, Ser. No. 475,783
1 Claim. (Cl. 33—27)

This invention relates to geometrical instruments and in particular relates to an instrument having versatile utility as a carpenters' tool.

It is an object of the present invention to provide a geometrical instrument with which a carpenter may, with the aid of a manually held pencil or other scriber, lay out angles, lines, circles, and arcs onto lumber or other structural material.

It is another object of the present invention to provide a geometrical instrument for enscribing various types and dimensions of angles, lines, circles, and arcs, said geometrical instrument having a minimum of wearable moving parts so as to minimize the tendency for eventual inaccurate measurements by the tool.

It is yet another object of the present invention to provide an exceedingly versatile geometric instrument with which almost any acute angle and supplements thereof may be made.

It is a further object of the present invention to provide a carpenters' geometric instrument that is economical to manufacture, durable and true during even extended use, exceedingly adaptable to many use conditions, and simple to repair.

With the above and other objects in view, which will appear as the description proceeds, this invention resides in the novel construction, combination, and arrangement of parts substantially as hereinafter described and more particularly defined by the appended claims, it being understood that such changes in the precise embodiment of the herein disclosed invention may be made as come within the scope of the claim.

In the drawing; wherein like numbers refer to like parts in the several views, and in which:

FIGURE 1 is a perspective view of the geometrical instrument of the present invention.

FIGURE 2 is a top plan view of the geometrical instrument of the present invention.

FIGURE 3 is a sectional view taken along line 3—3 of FIGURE 2.

FIGURE 4 is a sectional view taken along line 4—4 of FIGURE 3.

The geometrical instrument 10 comprises a generally trapezoidal stock member 20 and an elongate bar measuring device 60. Stock member 20 is of a block-like configuration having a pair of parallel planar trapezoidal faces. The mirror image of face 21 is congruent with respect to its conterminous trapezoidal face 22. Block-like stock 20 has a pair of parallel planar bases, specifically a longer lower base 23 and a shorter upper base 24, and a pair of planar lateral sides 25 and 26. Planar bases 23 and 24, as well as planar lateral sides 25 and 26, are all perpendicular to conterminous trapezoidal faces 21 and 22. At point 47 one of the lateral sides 25 provides a first angle of 45 degrees with lower base 23, while at point 48 another of the lateral sides 26 provides a second acute angle that is an exact multiple of 7½ degrees such as the 60 degree angle illustrated. Each trapezoidal face e.g. face 21, is provided with graduated linear measuring indicia at the four junctures of each face with the two bases and the two lateral sides.

Trapezoidal stock 20 has a central slot 30 therethrough of rectangular cross-sectional shape. Slot 30 is centered between trapezoidal faces 21 and 22, and the four walls of slot 30 are all perpendicular to planar bases 23 and 24. The width of slot 30 is coextensive with the entire length of upper base 24 between lateral sides 25 and 26 while the length of slot 30 is coextensive with the height of trapezoidal faces 21 and 22 between bases 23 and 24.

Level indicator means are incorporated into the trapezoidal stock 20. Specifically, bubble tubes 27, 28, and 29 are positioned substantially medially between and recessed wholly below trapezoidal faces 21 and 22.

There is an elongate bar 60 of rectangular cross-sectional shape and having parallel rectangular elongate faces 61 and 62. Elongate bar 60 passes through slot 30 of stock 20, the trapezoidal faces 21 and 22 completely obscuring those portions of elongate faces 61 and 62 positioned between bases 23 and 24. The width of elongate bar 60 is substantially equal to the width of slot 30 and to the length of upper base 24 so that bar 60 is slidably journalled by the trapezoidal block 20 and is maintained perpendicular to bases 23 and 24. Elongate faces 61 and 62 are each provided with graduated linear measuring indicia at the two elongate edges of bar 60.

For convenience in centering the instrument 10 for drawing arcs and circles, there is a sharp pin 63 attached perpendicularly to elongate bar 60. Sharp pin 63 must be located along that length of bar 60 having the graduated indicia so that its distance from indicia points on stock 20 can be determined with accuracy. In drawing arcs and circles, the point of a scriber e.g. pencil, is placed at juncture points between bar 60 and stock 20 i.e. points 41, 42, 43, and 44. Thus, to be strictly precise in drawing arcs and circles, pin 63 on face 61 should obviously be located adjacent to an elongate edge of said bar face. However, for most carpentry measurements sufficient accuracy will result with pin 63 located at the longitudinal axis of bar 20. To lend further versatility to the instrument, another pin 64 is attached to bar 60 on the reverse side 62, said pins 63 and 64 being substantially colinear. Obviously, all such pins e.g. 63 and 64, should be located toward the same end of bar 60 so that said bar may be readily removed from stock 20. To enhance geographical accuracy when drawing arcs, the elongate bar 60 must lie flatly along a lengthwise surface of slot 30; this goal is promoted with a spring means, herein as leaf spring 65 which is attached to stock 20 adjacent to a lengthwise surface of slot 30. Leaf spring 65 resiliently urges elongate bar surface 62 against stock member 20.

It is exceedingly important that the widths of elongate bar 60 and slot 30 be substantially equal to the length of upper base 24 and that bar 60 be perpendicular to bases 23 and 24. When these conditions exist, the carpenter may readily enscribe e.g. pencil, the corner angles 41–44 onto the lumber or other structural material. In the drawing, the corner angular values are as follows: corner 41, 135 degrees; corner 42, 150 degrees; and corners 43 and 45, 90 degrees.

In the drawing, corners 47 and 48 conveniently possess angular values of 45 and 60 degrees, respectively, because these angles are the most popularly utilized in carpentry operations. However, carpenters do also commonly require various other angular values having multiples of 7½ degrees. Thus, angular corners 47 and 48 might be at, for example, 22½ and 30 degrees respectively; angular corners 41 and 42 would have supplementary values of 157½ and 120 degrees respectively. Because of the infinite combination of 7½ degree multiple angles at 41, 42, 47, and 48, it is desirable that the carpenter have on hand several trapezoidal stocks, each stock having different sets of angular values at corners 47 and 48. Of course, the same elongate bar 60 could be readily employed with any one of the several differently angled stocks.

From the foregoing, the construction and operation of the geometric instrument device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

A geometrical instrument comprising:

(A) A generally trapezoidal stock comprising a pair of parallel planar conterminous trapezoidal faces having mirror image congruency, a pair of parallel planar bases including a shorter upper base and a longer lower base, a pair of planar lateral sides one of said lateral sides being at an angle that is a multiple of 7½ degrees with respect to the longer lower base and another of said lateral sides being at an acute angle with respect to the longer lower base that is a multiple of 7½ degrees, said planar bases and lateral sides being perpendicular to the conterminous trapezoidal faces, said trapezoidal stock having a slot therethrough of rectangular cross-sectional shape, said slot being centered between the trapezoidal faces and intersecting both planar bases at a 90 degree angle, the width of said slot being coextensive with the length of the shorter upper base, the respective trapezoidal faces being provided with graduated length measuring indicia along the bases and the lateral sides, and (B) An elongated bar of rectangular cross-sectional shape passing through said slot so that the trapezoidal stock completely obscures from view that portion of the elongate bar located within the slot, the width of the elongate bar being substantially equal to the width of the slot so that the elongate bar is slidably journalled by the trapezoidal stock, a leaf spring attached to the interior of the stock along one lengthwise surface of the slot so that one elongate surface of the bar is resiliently urged against the second lengthwise surface of the slot, both sides of the elongate bar being provided with graduated length measuring indicia along the elongate edges of the bar and a pair of colinear sharp points attached perpendicularly to either side of the elongate bar central axis at the zero point of the graduated measuring indicia of the elongate bar.

References Cited by the Examiner

UNITED STATES PATENTS

| | | | |
|---|---|---|---|
| 422,852 | 3/1890 | Traut | 33—103 |
| 506,416 | 10/1893 | Colley | 33—101 |
| 838,355 | 12/1906 | Realing | 33—95 |
| 1,007,038 | 10/1911 | Maupin | 33—101 X |
| 3,089,245 | 5/1963 | Cromer et al. | 33—27 |

FOREIGN PATENTS

| | | |
|---|---|---|
| 1,123,856 | 6/1956 | France. |
| 276,736 | 10/1951 | Switzerland. |

LEONARD FORMAN, *Primary Examiner.*

H. N. HAROIAN, *Examiner.*